(12) United States Patent
Cook et al.

(10) Patent No.: US 8,181,438 B2
(45) Date of Patent: May 22, 2012

(54) COMPOSITE FISHING LINE

(75) Inventors: Roger Cook, Spirit Lake, IA (US); Jim Thelen, Estherville, IA (US); Joe Meyer, Milford, IA (US)

(73) Assignee: Pure Fishing, Inc., Columbia, SC (US)

( * ) Notice: Subject to any disclaimer, the term of this patent is extended or adjusted under 35 U.S.C. 154(b) by 103 days.

(21) Appl. No.: 12/906,312

(22) Filed: Oct. 18, 2010

(65) Prior Publication Data

US 2012/0090289 A1 Apr. 19, 2012

(51) Int. Cl.
*D02G 3/02* (2006.01)
(52) U.S. Cl. .......................................................... 57/238
(58) Field of Classification Search .................. 57/236, 57/238; 43/44.98; 428/373, 374
See application file for complete search history.

(56) References Cited

U.S. PATENT DOCUMENTS

| | | | |
|---|---|---|---|
| 4,353,960 A * | 10/1982 | Endo et al. ..................... 428/373 |
| 5,131,218 A * | 7/1992 | Berger ............................. 57/211 |
| 5,231,820 A * | 8/1993 | Berger ............................. 57/207 |
| 5,407,623 A | 4/1995 | Zachariades et al. |
| 5,540,990 A | 7/1996 | Cook |
| 5,573,850 A | 11/1996 | Cunningham |
| 5,659,994 A * | 8/1997 | Cutter et al. .................. 43/44.98 |
| 5,749,214 A | 5/1998 | Cook |
| 5,884,617 A | 3/1999 | Nelson |
| 6,148,597 A | 11/2000 | Cook |
| 6,671,997 B2 * | 1/2004 | Lindgren ..................... 43/44.98 |
| 6,716,234 B2 * | 4/2004 | Grafton et al. ................ 606/228 |
| 7,081,297 B2 | 7/2006 | Tam et al. |
| 7,081,298 B2 | 7/2006 | Nakanishi |
| 7,344,668 B2 | 3/2008 | Tam et al. |
| 7,584,596 B2 | 9/2009 | Nakanishi |
| 7,666,501 B2 | 2/2010 | Kurian et al. |
| 2003/0082381 A1 * | 5/2003 | Nakanishi ..................... 428/375 |
| 2003/0226309 A1 * | 12/2003 | Lindgren ..................... 43/44.98 |
| 2005/0150152 A1 * | 7/2005 | Holy ................................. 43/100 |
| 2008/0048355 A1 | 2/2008 | Tam et al. |
| 2009/0286080 A1 | 11/2009 | Nakanishi |
| 2009/0321976 A1 | 12/2009 | Nguyen et al. |
| 2010/0192758 A1 | 8/2010 | Clough |

* cited by examiner

*Primary Examiner* — Shaun R Hurley
(74) *Attorney, Agent, or Firm* — Roylance, Abrams, Berdo & Goodman, L.L.P.

(57) ABSTRACT

Braided or twisted lines made from a) gel spun polyolefin yarns and b) at least one other yarn or monofilament are stretched to increase line tenacity. If desired, stretching conditions can also be chosen to significantly reduce the denier of the line.

18 Claims, No Drawings

COMPOSITE FISHING LINE

FIELD OF THE INVENTION

The present invention relates to a fishing line made with two or more yarns of differing polymeric compositions. Preferably, these yarns are collected by braiding or twisting to form fishing lines of adequate diameter and tenacity that may then be further processed by drawing the line under tension in one or more stages to an even higher tenacity. Preferably, at least one of the yarns is made with filaments of high tenacity, ultrahigh molecular weight polyolefin fibers.

BACKGROUND OF THE INVENTION

Fishing lines based on ultrahigh molecular weight, high tenacity, polyolefin yarns represented a dramatic shift in the technology of fishing lines. The filaments and their manufacturing process are described in Kavesh et al. U.S. Pat. No. 4,413,110; Smith et al. U.S. Pat. No. 4,344,908; Smith et al. 4,422,993; Kavesh et al. U.S. Pat. No. 4,356,138; Maurer E. P. 55,001; Harpell et al. U.S. Pat. No. 4,455,273; Kavesh et al, U.S. Pat. No. 4,897,902; Neal U.S. Pat. No. 5,277,858; and Kirkland et al. WO 94/00627. In general, the filaments are made by spinning from a gel solution containing the polymer in a solvent. As the solvent is removed from the spun filament, the filament is stretched to form a high strength, high tenacity filament of high molecular weight. Filaments made from linear polyethylene or polypropylene exhibit a molecular weight of at least 400,000, a tenacity of at least 15 g/denier, a tensile modulus of at least 500 g/denier, a melting point of at least 140° C.

Once bundled into yarns, a plurality of yarns can be made into an excellent fishing line. Processes for doing so are described in Cook U.S. Pat. Nos. 5,749,214; 5,540,990 and 6,148,597. The process described in these patents generally teach a re-stretching or "re-drawing" process under suitable heat and tension to cause the fishing line to lengthen with an increase in tenacity.

Another process is described in Cunningham et al. U.S. Pat. No. 5,573,850 which discloses a yarn having a polyethylene core that is then sheathed in a heated polymeric coating. The result of this process is described as providing monofilament-like characteristics to a multifilament construction.

The disclosures of each of these patents are herein incorporated by reference.

The high tenacity and low degree of stretch while submerged in water has made such fishing lines an important tool for anglers of all skill levels. Despite their technological prowess for many aspects of fishing, however, lines made from ultrahigh molecular weight, high tenacity polyolefin yarns have one shortcoming for some anglers: the lines float. With a specific gravity of only 0.97, some fishing techniques require that the fishing line have a negative buoyancy to get the lure at the right depth with the right action at that depth.

The use of weights added to the terminal end of the line do not satisfactorily address the issues associated with a floating line. For example, floating lines tend to pull a trolled lure to the water's surface thereby requiring additional weight to pull the lure back down. This combination of factors postures the lure in an upward orientation or with a more sharply sloping angle to the trailing line than would be desired. Floating lines may also disrupt or prevent a fishing technique that relies on a nonmoving lure that might stimulate a stunned prey.

It would be desirable to have a fishing line with the high tenacity and low stretch properties that are characteristic of fishing lines made with ultrahigh molecular weight, high tenacity, polyolefin yarns but with an overall specific gravity of greater than 1.0 so that the fishing line has negative buoyancy apart from any added weight, terminal connector or lure. This is not as easy as one might think.

A fishing line should have a relatively smooth exterior surface along its entire length. Such smoothness dramatically affects the drag resistance characteristics of the fishing line so surface bumps, ridges and protrusions above the line surface are defects that should be avoided to make a desirable fishing line. Thus, any composite of fishing line yarns must consider the yarn accumulation process, e.g., braiding, twisting or nonwoven formation, as well as the processing temperature, duration, draw rate (if any), number of draw stations and the chemistries associated with any processing aids, lubricants, coatings or the like that are used during the manufacturing process. All of the materials used in any composite must act in substantially the same way, despite any differences in chemistry, to minimize or avoid surface protrusions immediately following manufacture as well as up to months after manufacture despite a wide variety of packaging, shipping and storage conditions and extremes.

It would further be desirable to have a sinking, composite fishing line that would have a minimum of surface defects despite extended storage conditions and environmental extremes.

SUMMARY OF THE INVENTION

It is an objective of the invention to provide a sinking, composite fishing line and a method for its manufacture that use: (a) at least one first component yarn that consists essentially of ultrahigh molecular weight, high tenacity polyolefin yarn that is buoyancy neutral or positive and (b) at least one second component comprising a second filamentous yarn or monofilament made from a material that has negative buoyancy, i.e., exhibits a specific gravity of greater than 1.0.

It is another objective of the invention to supply a method for making a sinking, composite fishing line that exhibits the high strength and low stretch of ultrahigh molecular weight, high tenacity polyolefin but with a net negative buoyancy.

In accordance with this and other objectives of the invention that will become apparent from the description herein, fishing lines according to the invention comprise: a composite fishing line with a net negative buoyancy in water wherein the fishing line comprises: (a) a first filamentous line component comprising a first yarn consisting essentially of filaments made of ultrahigh molecular weight, high tenacity, polyolefin and (b) a second filamentous line component comprising a second yarn or a monofilament, said second component exhibiting a specific gravity of greater than 1.0.

A manufacturing process according to the invention comprises: stretching the composite fishing line under tension and heat at conditions sufficient to increase tenacity of the resulting fishing line by at least 10% relative to its tenacity before the stretching.

The composite fishing line of the invention counteracts the normally buoyant nature of the high tenacity, polyolefin component to provide a fishing line of high tenacity that has a net negative buoyancy in water. The manufacturing process of the invention re-stretches or "re-draws" this composite fishing line under heat and tension that force the components to re-orient their molecular structures into a composite fishing line of a smaller diameter but with a tenacity that is at least 10% higher than the undrawn composite while still retaining the net negative buoyancy that allows the composite fishing line to be used in places and for fishing styles that require a sinking line.

DETAILED DESCRIPTION OF THE INVENTION

Fishing lines according to the invention comprise: a composite fishing line with a net negative buoyancy in water wherein the fishing line comprises: (a) a first line component comprising a first yarn comprising filaments made of ultrahigh molecular weight, high tenacity, polyolefin and (b) a second line component comprising a second yarn or a monofilament, said second line component exhibiting a specific gravity of greater than 1.0. The first and second line components are combined by either braiding or twisting using an odd or even number of plies of first and second line components.

Fishing lines according to the invention are preferably made with a total of 3-64 first and second line components, preferably a total of 4-10 line components made with yarns and, optionally, monofilaments. An even number of plies permits the manufacture of twisted fishing lines that have a net negative twist effect so the resulting line stays twisted in use.

The first and second line components can be used for the fishing line of the present invention in virtually any ratio, i.e., within the range of 1:63 to 63:1. A preferred range of first line component to second line component is within the range from 1:9 to 9:1 and even more preferably within the range of 1:3 to 3:1. The best combination of strength to diameter ratio, sink rate and fishing performance seems to be found in composite lines in which an even number of yarns of both first and second line components are used in a substantially equal total denier of each, i.e., braids having two yarns of each component (i.e., "2×200+2×200") in which all four yarns are about 200 denier each or a braid having four 100 denier yarns of first component and two yarns of second component having a denier of 200 (i.e., "4×100+2×200").

The first and second line components for the present invention preferably exhibit a size within the range from about 20 denier to about 5000 denier. Larger yarn and monofilament sizes can be used with a corresponding adjustment to the applicable processing conditions. Preferred fishing lines are made with first and second line components that exhibit a size from about 40 denier to about 600 denier. Even more preferred are fishing lines that use first and second line components that are made almost completely of yarns of their respective compositions.

The first line component is at least one yarn that consists essentially of filaments made from ultrahigh molecular weight, high tenacity polyolefin. Such materials are formed by spinning from a gel and are often referred to as "gel spun polyolefins." Such materials are characterized by an intrinsic viscosity of about 5-45 dl/g when measured in decalin at 135° C. See Kavesh et al. U.S. Pat. No. 4,413,110; Cook U.S. Pat. Nos. 5,749,214; 5,540,990 and 6,148,597; Cunningham et al. U.S. Pat. No. 5,573,850 and Tam et al., Published U.S. Patent Application Publication No. 2008/0048355.

The gel spun polyolefin yarns are preferably made of ultrahigh molecular weight, high tenacity polyethylene, polypropylene, poly(butene-1), poly(4-methyl-pentene-1), their copolymers, blends and adducts. Such yarns are characterized by a molecular weight of at least 400,000 and more preferably at least about 800,000, and most preferably at least about one million; a tenacity of at least 15 g/denier; a tensile modulus of at least 500 g/denier; and a melting point of at least 140° C. See, Kavesh et al. U.S. Pat. Nos. 4,413,110 and 4,551,296 the disclosures of which are herein incorporated by reference.

Gel spun polyethylene yarns are available in partially oriented forms and highly oriented forms. See Tam et al., Published U.S. Patent Application Publication No. 2008/0048355. Such partially-oriented yarns (POY) generally exhibit a tenacity within the range of about 12-25 g/d, as measured by ASTM D2256-02 at 25.4 cm (10 in.) gauge length at a strain rate of 100%. In contrast, the highly-oriented yarns (HOY) are disclosed as exhibiting tenacities within the range of 38-70 g/d. The examples found in the Tam et al. published application show HOY tenacities of 37.0 to 45.7 for the exemplified re-drawing process.

The process of the present invention is well suited for use with first line component yarns that comprise gel spun polyolefin yarns having a tenacity within the range of about 35-50 g/d. Such yarns would be characterized as "highly oriented" but have been found to respond to the present process by further elongation and even greater strength-per-unit, e.g., tenacity or pounds force per square inch in cross sectional area at break.

The second line component comprises a second yarn or a monofilament. Preferably, the second line component can be further drawn or elongated to a new, nonreversible length under drawing conditions suitable for the first line component. Preferably, this second line component can also benefit from additional stretching under the heat and tensions needed for re-drawing the high tenacity yarns of the first line component. Suitable second line component yarn or monofilament materials include "partially-oriented" filament yarns ("POYs"). Such yarns are made with filaments that were not fully oriented during their manufacture. See, U.S. Pat. No. 6,287,688 (partially oriented poly(trimethylene terephthalate) yarn); published U.S. patent application no. 2008/0048355 (ultrahigh molecular weight, multifilament poly(alpha-olefin) yarns); and U.S. Pat. No. 7,666,501 (manufacture of poly(trimethylene terephthalate)/poly(alpha-hydroxy acid) biconstituent filaments). Yarns from such filaments will lengthen under the effects of heated re-drawing in a substantially irreversible manner and will not retract when tension is removed that might otherwise form kinks or discontinuities in the surface of the fishing line.

Suitable second line components include poly(tetrafluoroethylene) (PTFE), expanded poly(tetrafluoroethylene) (ePTFE), and partially-oriented yarns of polyethylene terephthalate ("POY PET"), nylon ("POY nylon"), other polyamides and copolymers of polyamides ("POY PA"), and polyvinylidene fluoride ("POY PVDF"). The preferred second line component is a yarn that contains filaments of ePTFE.

It should be noted here that the use of tenacity as a term for comparison of the present composite line with other fishing lines made from other gel spun polyolefin yarns has the potential to mislead. Specifically, tenacity for yarns is a unit that measure the ultimate breaking strength of the yarn (in gram-force units) divided by the linear density of the yarn. The present composite uses the strength of the first line component as the primary strength of the composite. The second line component has a higher linear density primarily for imparting a sinking characteristic to the composite. As the second line component will likely not have a specific strength that is as high as the first line component, the resulting composite will reflect a lower tenacity than a corresponding fishing line made only of a first line component material.

The fishing lines of the present invention are preferably formed as braids or twists of suitable first and second line components. These braided or twisted lines may be used without further processing or, preferably, are subjected to heated reorientation by re-drawing the fishing line under suitable combinations of tension, heat and time to lengthen the fishing line while reducing its diameter and increasing the tenacity of the resulting fishing line relative to its original "as-braided" or "as-twisted" state. The heated post-formation processing of the present invention also has the advantage of tightening the braid in a manner that is not possible with conventional post-processing of braided lines.

Braided lines according to the invention are made with conventional braiding equipment and 3-16 discrete yarns braided about a central axis. The braid tightness (measured in "picks per inch") is adjusted to provide a limp line of good surface quality according to the prevailing standards of the line manufacturer. The braids used as feed to the present fusion process preferably exhibit a size within the range from about 100 denier to about 3000 denier and more preferably within a range from about 200-1200 denier.

Yarns of the first and second line components can be braided to produce a uniform distribution of each in the resulting fishing line. If desired, one line component yarn may be used as a central core around which are braided multiple yarns of the other line component or combinations of yarns of the first and second line components.

Twisted lines of the invention can be made from either single, twisted yarns or in 2-4 ply, torque-balanced structures. Preferably, the line is twisted to produce a neutral net twist, i.e., the twisted fibers will remain intertwined even when free of tensile loading. In the conventional language of the art, single yarns are twisted in a "z" direction, while 2-4 of these z-twisted yarns can then be plied together in the "s" (opposite) direction. The "z" pitch and "s" pitch are chosen to balance the torque of each twist. Twists are measured in terms of "twists-per-inch" (tpi) or "twists-per-meter" (tpm). Like the braids, twists used as feed to the present post-formation process preferably exhibit a size within the range from about 100 denier to about 3000 denier and more preferably within a range from about 200-1200 denier.

According to the invention, composite fishing lines can be used in their braided or twisted forms without further processing. These unprocessed fishing lines will exhibit good strength, a sinking character when used for fishing and limp handling characteristics.

Unprocessed braided or twisted composite fishing lines can be substantially improved in overall fishing performance if they are re-drawn in post-formation processing. Such processing can include the addition of coloring agents, coating agents for color fixation, and further re-drawing under combinations of tension and externally applied heat that will cause the composite fishing line to stretch irreversibly and reduce its overall diameter in a uniform manner that forms more of an even better fishing line. If desired, the heat and tension can be increased to permit fusion between adjacent filaments of the gel spun polyolefin yarn used as component 1 in the composite. See, Cook U.S. Pat. No. 6,148,597 the disclosure of which is herein incorporated by reference.

One or more dyes, pigments or other colorants can be applied before the fishing line enters the first heated stage of the re-drawing process. Preferred coloring agents include water-based pigment suspensions that are applied to the braided line so as to penetrate the fishing line yarn structure and become intimately entrapped therein.

If desired, other coloring materials can be applied to the surface of the line, yarn, or filament and may coat only the surface or, preferably, penetrate the structure of the fishing line yarn and become intimately entrapped therein. Such other coloring materials include mineral oils (e.g., heat transfer grade mineral oils with an average molecular weight of 250-700) paraffin oils, and vegetable oils (e.g., coconut oil). A preferred coloring material contains a solution that includes a paraffin wax and mineral oil. This coating acts as throughout the yarn structure and retains the pigment solids during the re-drawing process while also helping to form a smoother external surface. The smooth external coating may also enhance casting distance by reducing surface friction on the final fishing line as it passes through the lines guides of a fishing pole.

The composite fishing lines are heated by passage through an oven while under tension. One or more ovens can be used. Preferably 2-4 ovens are used to heat the line immediately before passing to a draw roller.

The tension induced by the draw roller permits the fishing line to withstand exposure to temperatures that are near, or even above, the actual melting range of the component yarn filaments. The use of a temperature that is too high for the speed and tension conditions can cause the polymeric structure of the yarn filaments to melt and lose tenacity, often resulting in a break with fully melted ends. The precise conditions are highly dependent on the specific equipment used, the denier of the yarns making up the composite fishing line, the speed of the yarn down the line, and the tension applied to the heated yarn by the draw rollers.

Oven temperatures should generally be operated at temperatures within a range from about 110° C. to about 160° C., depending on the line tension and speed of advancement through the oven. If the manufacturer desires to avoid filament fusion at typical commercial manufacturing speeds, temperatures of about 140°-150° C. are typically useful to soften the polymeric chains and allow them to slip and re-orient into a composite fishing line having a higher tenacity than before the reorientation or re-drawing process. If surface fusion of adjacent filaments is desired at typical commercial operating speeds, temperatures of greater than about 150° C. and up to a temperature that is less than the melting range of the component yarn filaments can be used. Surface fusion of the yarn filaments is most preferably at a temperature within the range of about 150° to about 160° C. at commercial operating speeds.

The heated line is then passed over and around a draw roller that turns at a slightly faster rate than the speed of the line exiting the preceding oven. The proportion of the exit speed to the speed of the entering line is the "draw ratio" for that roller. This difference in speed induces tension in the line and causes the line to stretch. The "total draw ratio" is the product of the draw ratios of all stages.

Overall, the fishing line is stretched in one or more drawing stages at rates sufficient to increase the tenacity of the line by at least about 10% relative to the yarn tenacity before drawn by the present process. Preferably, the stretching is performed under conditions sufficient to realize a tenacity improvement of at least 15%, and more preferably a tenacity improvement within the range from about 15-200% relative to the original, unstretched, yarn used to make the composite fishing line of the present invention.

Tenacity is improved by stretching the braided or twisted line at a total draw ratio sufficient to increase the tenacity of the line relative to the original line before stretching according to the invention. Such stretching is performed at a total draw within the range from about 1-1000% (i.e., a total draw ratio of 1.01-11.0), preferably within the range from about 5-200% (total draw ratio of 1.05-3.0), more preferably within the range from about 10-100% (draw ratio of 1.1-2.0), and particularly within the range from about 25-50% (draw ratio of 1.25-1.5). Those in this art will appreciate, however, that the specific total draw ratio that is employed for any specific combinations of yarns will vary depending on the specific yarn materials, yarn deniers, tension, heat and residence time.

All documents, books, manuals, papers, patents, published patent applications, guides, abstracts and other reference materials cited herein are incorporated by reference in their entirety. While the foregoing specification teaches the principles of the present invention, with examples provided for the purpose of illustration, it will be appreciated by one skilled in the art from reading this disclosure that various changes in form and detail can be made without departing from the true scope of the invention.

EXAMPLES

In the following examples, braided fishing lines are made with a first line component of yarns of UHMW, gel-spun polyethylene and ePTFE. In each instance, the number of yarns of polyethylene filament yarns and the yarn denier are listed followed by the number and denier of the polyethylene yarns.

Examples 1-2

A braided fishing line was made with four yarns of UHMW, gel-spun polyethylene (4×100 denier) and ePTFE (4×200 denier) to determine whether ePTFE could be drawn under two sets of conditions that would be sufficient to re-draw the UHMW polyethylene yarn which had a tenacity of about 40 g/d before it was braided. Two samples of the same composite braid were processed in three, heated, drawing stages at two different total draw ratios with oven temperature adjusted for the higher draw ratio.

In both stages, the oven temperatures were adjusted to avoid surface softening or filament fusion of adjacent filaments in the gel spun polyethylene line used for component 1. If fusion was desired to form a quasi-monofilament type of character, noting the typical resistance of ePTFE materials to form surface bonds, higher temperatures could have been used.

Ten samples of the resulting fishing line were then measured for diameter to determine whether either component was relaxing once tension had been removed or otherwise not irreversibly extended as a result of the drawing process. The following Table 1 shows the conditions and results.

TABLE 1

| Example | 1 | 2 |
|---|---|---|
| Construction | 4 × 100 PE + 4 × 200 ePTFE | 4 × 100 PE + 4 × 200 ePTFE |
| Total Draw Ratio | 1.25 | 1.5 |
| Draw Roller 1 draw ratio | 1.083 | 1.167 |
| Oven 1 temp (° C.) | 150 | 152 |
| Oven 1 res. time (s) | 32.0 | 30.7 |
| Draw Roller 2 draw ratio | 1.077 | 1.143 |
| Oven 2 temp (° C.) | 145 | 151 |
| Oven 2 res. time (s) | 29.6 | 26.6 |
| Draw Roller 3 draw ratio | 1.071 | 1.125 |
| Oven 3 temp (° C.) | 145 | 151 |
| Oven 3 res. time (s) | 27.6 | 23.5 |
| Avg. Diameter (in.) | 0.0133 | 0.0119 |
| Avg. Break Strength (lb-force) | 33.0 | 28.2 |
| Final Denier | 1054.0 | 883.5 |
| Final Tenacity (g/d) | 14.2 | 14.5 |

The results in Table 1 show that braids made with gel spun polyethylene and ePTFE can, in fact, be re-drawn in post-formation processing. Previously, ePTFE was not thought to be amenable to reorientation processing. The fairly narrow range of diameters around the average show that the braid is not exhibiting post-relaxation puckering or loosening of the braid.

Examples 3-4

Examples 3 and show the construction and post-braid processing of various constructions of fishing lines using gel spun polyethylene yarns having an as-received tenacity within the range of about 44 g/d for component 1. Yarns of ePTFE were used for component 2. Ten specimens were tested from each fishing line to arrive at the stated values.

TABLE 2

| Example | 3 | 4 |
|---|---|---|
| Construction | 2 × 400 PE + 2 × 400 ePTFE | 3 × 200 PE + 3 × 200 ePTFE |
| Total Draw Ratio | 1.25 | 1.25 |
| Draw Roller 1 draw ratio | 1.083 | 1.083 |
| Oven 1 temp (° C.) | 146 | 146 |
| Oven 1 res. time (s) | 28.4 | 28.4 |
| Draw Roller 2 draw ratio | 1.077 | 1.077 |
| Oven 2 temp (° C.) | 143 | 143 |
| Oven 2 res. time (s) | 26.3 | 26.3 |
| Draw Roller 3 draw ratio | 1.071 | 1.071 |
| Oven 3 temp (° C.) | 143 | 143 |
| Oven 3 res. time (s) | 24.5 | 24.5 |
| Mean Avg. Diameter (in.) | 0.0165 | 0.0141 |
| Mean Break Strength (lb-force) | 61.1 | 50.5 |
| Final Denier | 1472.9 | 1033.8 |
| Final Tenacity (g/d) | 18.8 | 22.2 |

Examples 5-6

The fishing lines of Examples 5 and 6 were prepared and tested to show the effects of using yarns of dissimilar deniers within the same braid. Table 3 shows the details.

TABLE 3

| Example | 5 | 6 |
|---|---|---|
| Construction | 2 × 150 PE + 1 × 200 ePTFE + 1 × 90 ePTFE | 2 × 100 PE + 2 × 90 ePTFE |
| Total Draw Ratio | 1.25 | 1.25 |
| Draw Roller 1 draw ratio | 1.083 | 1.083 |
| Oven 1 temp (° C.) | 146 | 146 |
| Oven 1 res. time (s) | 28.4 | 28.4 |
| Draw Roller 2 draw ratio | 1.077 | 1.077 |
| Oven 2 temp (° C.) | 143 | 143 |
| Oven 2 res. time (s) | 26.3 | 26.3 |
| Draw Roller 3 draw ratio | 1.071 | 1.071 |
| Oven 3 temp (° C.) | 143 | 143 |
| Oven 3 res. time (s) | 24.5 | 24.5 |
| Mean Avg. Diameter (in.) | 0.0100 | 0.0083 |
| Mean Break Strength (lb-force) | 24.8 | 18.1 |
| Final Denier | 503.3 | 339.6 |
| Final Tenacity (g/d) | 22.3 | 24.2 |

The information in Table 3 shows that yarns of dissimilar deniers can be braided together and re-drawn according to the present invention to produce a fishing line of good strength and tenacity.

Examples 7-18

Table 4 shows the results of various tests and measurements of braided yarns in Examples 7-18 that contain, by total denier, about 50% gel spun polyethylene and about 50% ePTFE. The Processed Braid was treated by the post-formation re-drawing process of the present invention.

TABLE 4

| Ex. | Line | Nominal Strength ("lb test") | Diameter | Denier | Break Strength (lb) | psi | Sink Rate (in/sec) |
|---|---|---|---|---|---|---|---|
| 7 | Unprocessed | 10 | 0.01001 | 399.3 | 18.1 | 230,003 | 1.57 |
| 8 | Braid | 15 | 0.01211 | 597.3 | 22.1 | 191,749 | 2.10 |
| 9 | | 20 | 0.01397 | 847.6 | 21.8 | 142,052 | 2.40 |
| 10 | | 30 | 0.01723 | 1221.9 | 45.3 | 194,414 | 2.67 |
| 11 | | 50 | 0.02033 | 1784.4 | 54.0 | 166,391 | 3.06 |
| 12 | | 100 | 0.02902 | 3427.7 | 86.2 | 130,323 | 3.68 |
| | Avg. psi | | | | | 175,822 | |
| 13 | Processed | 10 | 0.00830 | 339.6 | 18.1 | 334,538 | 1.69 |
| 14 | Braid | 15 | 0.01000 | 503.3 | 24.8 | 315,773 | 2.20 |
| 15 | | 20 | 0.01190 | 697.5 | 33.9 | 304,810 | 2.67 |
| 16 | | 30 | 0.01410 | 1033.8 | 50.5 | 323,427 | 3.03 |
| 17 | | 50 | 0.01650 | 1472.9 | 61.1 | 285,757 | 3.28 |
| 18 | | 100 | 0.02300 | 2882.1 | 126.0 | 303,276 | 4.39 |
| | Avg. psi | | | | | 311,263 | |
| | Improvement due to processing | | | | | 77% | |

Inspection of the data in Table 4 will show that an unprocessed braid according to the invention exhibited sinking rates proportional to the amount of ePTFE in the composite. Substantial improvements are found when the braid is re-drawn under total draw rate, heat and tension parameters of the preferred conditions for the post-formation process described above. Notably, denier decreased in all braid sizes while the break strength stayed the same or improved. The average psi—pounds force per square inch of cross sectional area—increased an average of 77% due to the post-formation processing of the present invention.

Examples 19-44

Braids of UHMW polyethylene yarns (DYNEEMA SK-75 available from DSM N.V., "PE") and ePTFE yarns were re-drawn according to the invention and tested for sinking rate. The results of these samples against a variety of comparative examples are shown in Table 5.

TABLE 5

| Ex. | Line Type | Avg. Sink Rate (In/s) | No. Yarns | Average of Denier | Density |
|---|---|---|---|---|---|
| 19 | 8 × 200 SK75 + 200 PTFE core | 0.00 | 8 | 2192.1 | 0.843 |
| 20 | 8 × 100 SK75 + 200 PTFE core | 0.67 | 8 | 1198.5 | 0.998 |
| 21 | PE/Dacron braid 10# | 0.70 | 4 | 433.1 | 0.998 |
| 22 | PE/Dacron braid 20# | 0.75 | 4 | 669.6 | 0.998 |
| 23 | 8 × 200 SK75 + 400 PTFE core | 0.75 | 8 | 2384.4 | 0.871 |
| 24 | 2 × 400 SK75 + 2 × 400 PTFE braid | 1.12 | 4 | 1798.2 | 1.214 |
| 25 | 2 × 100 SK75 + 2 × 90 ePTFE braid | 1.33 | 4 | 431.1 | 0.998 |
| 26 | 4 × 100 SK75 + 4 × 90 ePTFE braid | 1.38 | 8 | 867.9 | 1.183 |
| 27 | 2 × 100 SK75 + 2 × 90 ePTFE braid | 1.44 | 4 | 443.6 | 0.998 |
| 28 | 4 × 100 SK75 + 4 × 90 ePTFE braid | 1.50 | 8 | 855.8 | 1.167 |
| 29 | 8 × 100 SK75 + 400 PTFE core | 1.53 | 8 | 1403.2 | 1.059 |
| 30 | 3 × 100 SK75 + 3 × 90 ePTFE braid | 1.59 | 6 | 633.9 | 1.171 |
| 31 | 3 × 100 SK75 + 3 × 90 ePTFE braid | 1.69 | 6 | 666.8 | 1.238 |
| 32 | PE with PVDF core yarn 20# | 1.78 | 4 plus core | 861.1 | 1.160 |
| 33 | 2 × 200 SK75 + 2 × 200 PTFE braid | 1.91 | 4 | 953.7 | 1.106 |
| 34 | PE with PVDF core yarn 40# | 1.97 | 8 plus core | 1711.3 | 1.148 |
| 35 | 4 × 200 aramid + 200 PE core w/yellow coating | 2.07 | 4 plus core | 1051.5 | |
| 36 | 4 × 400 SK75 + 4 × 400 PTFE braid | 2.08 | 6 | 3721.3 | 1.052 |
| 37 | 4 × 200 aramid + 200 PE core w/green coating | 2.12 | 4 plus core | 1065.6 | |
| 38 | 4 × 200 aramid + 100 PE core w/green coating | 2.14 | 4 plus core | 644.8 | |
| 39 | 2 × 200 + 2 × 400 PE +fibreglass core | 2.57 | 4 | 2839.1 | 1.224 |
| 40 | 4 × 100 PE + 4 × 200 PTFE braid | 2.94 | 8 | 1451.0 | |
| 41 | 200 SK75 core + 8 × 90 ePTFE braid | 2.96 | 8 | 994.6 | 1.686 |
| 42 | 400 SK75 core + 16 × 90 ePTFE braid | 3.53 | 16 | 1954.1 | 1.220 |
| 43 | 400 SK75 core + 16 × 90 ePTFE braid | 3.67 | 16 | 1885.0 | 1.558 |
| 44 | PE and PTFE braid over lead core | 17.60 | 8 | 16938.0 | 5.448 |

The information in Table 5 shows that increasing levels of heavier, second line component materials (e.g., ePTFE, PVDF, fibreglass, and aramid yarn or monofilament) in the composite fishing line increase the density of the fishing line and, correspondingly, the sink rate. A fishing line that is too heavy and too dense is, however, difficult to cast and is most suited for use as a line for trolling, ice fishing, jigging and similar forms of fishing that do not require dynamic casting. It was found that fishing lines exhibiting a sink rate of less than about 2.5 in/s can be cast with those having a sink rate of less than about 2.0 presented the better balance of casting distance and sink rate.

What is claimed is:

1. A composite fishing line with a net negative buoyancy in water, said fishing line comprising:
  (a) a first line component consisting essentially of a first yarn of filaments made of ultrahigh molecular weight, high tenacity, polyolefin filaments, and
  (b) a second line component comprising a second yarn or a monofilament selected from the group consisting of:
    (A) partially-oriented filament yarns comprising partially oriented (i) poly(trimethylene terephthalate) yarn, (ii) poly(trimethylene terephthalate)/poly(alpha-hydroxy acid) biconstituent filaments, (iii) polyethylene terephthalate, (iv) nylon, (v) polyamides and copolymers of polyamides, or (vi) polyvinylidene fluoride;
    (B) poly(tetrafluoroethylene); and
    (C) expanded poly(tetrafluoroethylene), said second line component exhibiting a specific gravity of greater than 1.0, wherein said composite fishing line has been re-drawn by stretching said composite fishing line under tension and heat at conditions sufficient to increase tenacity of the resulting fishing line by at least 10% relative to its tenacity before the stretching.

2. A composite fishing line according to claim 1 wherein said first yarn is made with filaments of polyethylene that exhibit a tenacity of at least 15 g/denier and a tensile modulus of at least 500 g/denier.

3. A composite fishing line according to claim 2 wherein said second filamentous line component is made with said second yarn that comprises filaments of expanded poly(tetrafluoroethylene) or poly(tetrafluoroethylene).

4. A composite fishing line according to claim 1 comprising 2-5 first component yarns of said first line component and 2-5 second component yarns of said second line component.

5. A composite fishing line according to claim 4 wherein said first line component and said second component have been braided or twisted together to form said composite fishing line.

6. A composite fishing line according to claim 5 wherein said fishing line has been re-drawn by stretching the composite fishing line under tension and heat at conditions sufficient to increase tenacity of the resulting fishing line by at least about 15% relative to its tenacity before the stretching.

7. A composite fishing line according to claim 6 wherein said fishing line has been re-drawn by stretching the composite fishing line at a temperature within the range of about 110° C. to about 160° C. and at a total draw ratio within the range from about 1% to about 1000%.

8. A composite fishing line according to claim 6 wherein said fishing line has been re-drawn at a temperature within the range of about 135° C. to about 155° C.

9. A process for increasing tenacity in a sinking, composite fishing line comprising: (a) a first line component consisting essentially of a first yarn of filaments made of ultrahigh molecular weight, high tenacity, polyolefin and (b) a second line component comprising a second yarn or a monofilament, said second component exhibiting a specific gravity of greater than 1.0; said process comprising a step of:
stretching the composite fishing line under tension and heat at conditions sufficient to increase tenacity of the resulting fishing line by at least 10% relative to its tenacity before the stretching.

10. A process according to claim 9 wherein the stretching step comprises stretching said composite fishing line at a temperature within the range of about 135° C. to about 155° C.

11. A process according to claim 10 wherein the stretching step comprises stretching said composite fishing line to a total draw ratio within the range from about 1.01 to about 9.0.

12. A process according to claim 9 wherein said first yarn consists essentially of filaments of polyethylene that exhibit a tenacity of at least 15 g/denier and a tensile modulus of at least 500 g/denier.

13. A process according to claim 12 wherein said second line component comprises a second yarn that comprises an oriented or partially oriented polymer.

14. A process according to claim 13 wherein said second yarn comprises filaments of expanded poly(tetrafluoroethylene).

15. A process according to claim 13 wherein the stretching step comprises
stretching said composite fishing line to a total draw ratio within the range from about 1.05 to about 3.0.

16. A process according to claim 13 wherein the stretching step comprises
stretching said composite fishing line to a total draw ratio within the range from about 1.1 to about 2.0.

17. A process according to claim 13 wherein the stretching step comprises
stretching said composite fishing line to a total draw ratio within the range from about 1.25 to about 1.5.

18. A composite fishing line according to claim 1 wherein said second line component comprises a partially-oriented polyethylene terephthalate yarn.

* * * * *